US006657988B2

(12) United States Patent
Toskala et al.

(10) Patent No.: US 6,657,988 B2
(45) Date of Patent: Dec. 2, 2003

(54) METHOD AND APPARATUS FOR TIMING ADJUSTMENT FOR UPLINK SYNCHRONOUS TRANSMISSION IN WIDE CODE DIVISION MULTIPLE ACCESS

(75) Inventors: Antti Toskala, Helsinki (FI); Markku Tarkiainen, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 392 days.

(21) Appl. No.: 09/759,982

(22) Filed: Jan. 12, 2001

(65) Prior Publication Data

US 2002/0093940 A1 Jul. 18, 2002

(51) Int. Cl.[7] .................................................. H04J 3/06
(52) U.S. Cl. ...................................... 370/350; 370/389
(58) Field of Search ................................. 370/350, 319, 370/295, 281, 344, 503, 510, 512, 520; 455/522

(56) References Cited

U.S. PATENT DOCUMENTS 6,144,861 A      11/2000  Sundelin et al. ............. 455/522

FOREIGN PATENT DOCUMENTS

WO          0062441      10/2000   ........... H04B/7/005

OTHER PUBLICATIONS

3rd Generation Path Technical Specification Group Radio Access Network; Study Report for uplink Synchronous Transmission Scheme (USTS) (Release 5).*
"Uplink Synchronous Transmission Scheme (USTS)"; 3GPP TSG–RAN WG #1; Jul. 4, 2000; XP002185297.
SK Telecom; "Uplink Synchronous Transmission Scheme (USTS) "; 3GPP TSG–RAN WG 1 #14; Jul. 4–7, 2000; Oulu, Finland; pp. 1–5.
SK Telecom; Study Report for Uplink Synchronous Transmission Scheme (USTS) ; 3GPP TSG WG 1 #17; Nov. 21–24, 2000; Stockholm, Sweden.
3G TR 25.USTS V0.0.0.0 (2000–mm) $3^{rd}$ Generation Partnership Project (3GPP); Technical Specification Group Radio Access Network; Study report for Uplink Synchronous Transmission Scheme (USTS)(Release 5).
3G TS 25.101 V3.1.0 (1999–12) $3^{rd}$ Generation Partnership Project (3GPP); Technical Specification Group (TSG) RAN WG4, UE Radio Transmission and Reception (FDD).
3GPP TSG RAN Working Group 1 meeting No. 18 (Jan. 15–Jan. 18, Boston, U.S.A,) Draft Minutes of #17 meeting.
3GPP TS 25.211 v3.4.0 (2000–09) $3^{rd}$ Generation Partnership Project (3GPP); Technical Specification Group Radio Access Network; Physical channels and mapping of transport channels onto physical channels (FDD) (Release 1999).

\* cited by examiner

Primary Examiner—Wellington Chin
Assistant Examiner—Brenda Pham
(74) Attorney, Agent, or Firm—Ware, Fressola, Van Der Sluys & Adolphson, LLP

(57) ABSTRACT

A method and apparatus for use in the uplink synchronous transmission in UTRA FDD. As the downlink DPCH field carries a transmit power command (TPC) in each of the slots in a radio frame, the TPC can be replaced by a Time alignment bit (TAB) to indicate whether the received arrival time at a Node B of a DPCH message from a UE is earlier or later than a desired arrival time. The TAB is sent to the UE over a number of times so as to allow the UE to adjust the uplink transmission time based on a summed value of the TABs. Preferably, the TABs are summed over 200 ms so that the searcher in Node B has sufficient time to verify the position of the UE in the time domain.

15 Claims, 5 Drawing Sheets

METHOD AND APPARATUS FOR TIMING ADJUSTMENT FOR UPLINK SYNCHRONOUS TRANSMISSION IN WIDE CODE DIVISION MULTIPLE ACCESS

TECHNICAL FIELD

The present invention generally relates to mobile telephone networks and, in particular, to timing control in uplink synchronous transmission in UTRA (Universal Mobile Telecommunication Terrestrial Radio Access) FDD (Frequency Division Duplex).

BACKGROUND OF THE INVENTION

Basic third-generation mobile telecommunication, as used in Universal Terrestrial Radio Access Network (UTRAN), uses time alignment in an Uplink Synchronous Transmission Scheme (USTS) to preserve orthogonality between channelization codes from different UEs (User Equipment) and to properly de-spread the cell-specific long scrambling code. UTRAN is a conceptual term identifying a part of a radio communication network wherein a plurality of mobile terminals communicate with each other through one or more base stations. In particular, UTRAN identifies part of the network, which consists of radio network controllers (RNCs) and Node Bs between an interconnection point (Iu) and the radio interface (Uu). The interconnection point (Iu) is located between an NRC and a core network, and the radio interface (Uu) is located between UTRAN and the user equipment (UE). This is the starting point for the third generation mobile phone system UMTS (Universal Mobile Telecommunication System). The architecture of UMTS will include UTRA for radio access.

One of the modes of UTRAN for the user equipment (UE) is the FDD (Frequency-Division Duplex) mode, as distinguished from the time-division duplex (TDD) mode. UE radio transmission and reception (FDD) is described in the Technical Specification (TS) 25.101 v 3.1.0 (1999-12) of the Third Generation Partnership Project (3GPP) and documents referenced therein. In particular, the USTS is described in Study Report for USTS, 3GPP TSG RAN WG1#17 (Nov. 21–24, 2000), and the frame structure for downlink DPCH is described in TS 25.211 v 3.4.0 (2000-09).

In a USTS mode, the transmission time at the UE is controlled by two steps. The first step is Initial Synchronization and the second is Tracking.

As illustrated in FIG. 1, the downlink Dedicated Physical Control Channel (DPCCH) frame structure consists of radio frames. Each radio frame is 10 ms long and has 15 slots, and each slot carries control information in the forms of Pilot bits, Transport Formal Combination Indicator (TFCI) bits, and Transmit Power Control (TPC) bits. In the initial Synchronization step, transmission time is adjusted through the initial timing control information given by a higher layer, as described in 3GPP TSG RAN WG1#17 (Nov. 21–24, 2000). Before adjustment, a DPCH (Dedicated Physical Channel) message is expected to arrive at a Node B at point A, as shown in FIG. 2. In FIG. 2, $\tau_{DPCH,n}$ is a multiple of 256 chips offset and $T_0$ is constant. After adjustment according to $T_{INIT\_SYNC}$, the arrival of the PDCH message at Node B is scheduled to occur at point B, $\tau_{DPCH,n} + T_{0+} T_{ref}$ later from the beginning of each frame.

The reference time $T_{ref}$ is given to RNC as initial loading data, and the desired arrival time becomes $\tau_{DPCH,n} + T_{0+} T_{ref}$. Since $\tau_{DPCH,n} = T_n \times 256$ chip, $T_n \in \{0, 1, \ldots, 149\}$, the desired arrival time may exist every 256 chips according to $\tau_{DPCH,n}$. Different UE arrives at the cell at one of the desired arrival times according to $\tau_{DPCH,n}$ and the orthogonality among channelization codes can be preserved.

In the Initial Synchronization step, UTRAN obtains the round trip propagation delay (RTPD) by doubling the value of Physical Random Access Channel (PRACH) Propagation Delay measured accordingly to a method as specified in TS 25.215 V3.5.0 (2000-12) and sets the amount of adjustment for initial synchronization $T_{INIT\_SYNC}$ to compensate for the difference between the RTPD and $T_{ref}$. UE adjusts its transmission time according to $T_{INIT\_SYNC}$ delivered from UTRAN. Since $T_0$ is a constant (1024 chips) and $T_{ref}$ is a given value and the same for all UEs in a cell, after initial synchronization, the arrival can be controlled to occur at ($\tau_{DPCH,n} + T_{0+} T_{ref} - 1.5$ chips, $\tau_{DPCH,n} + T_{0+} T_{ref} + 1.5$ chips) due to 3 chip resolution for reporting PRACH Propagation delay.

There may be variation around point B due to movement of UE, and the arrival of a DPCH message may be different from the desired arrival time. This difference can be eliminated by the Tracking Process using Time Alignment Bit (TAB) commands. In case of USTS, the TPC bits in slot #14 in frames with CFN mod 2=0 (even-numbered frames) are replaced by TABs. The procedure for the Tracking Process is as follows:

Node B compares the received arrival time with the desired arrival time from UE every 20 msec—the time period for two radio frames.

When the received arrival time is earlier than the desired arrival time at Node B, TAB is set to "0". When it is later than the desired arrival time, TAB is set to "1".

TAB replaces the TPC bit in slot #14 in frames with CFN mod 2=0.

At the UE, hard decision on the TAB shall be performed. When it is judged as "0", the transmission time shall be delayed by δT, whereas if it is judged as "1", the transmission time shall be advanced by δT. δT is the timing control step size, whose minimum value depends on the oversampling rate.

Accordingly, the procedure keeps the uplink DPCCH/DPDCH (DPDCH=Dedicated Physical Data Channel) frame of a UE arriving at Node B at the same point of each frame.

As described before, a TAB is provided to the UE in each timing adjustment period, which is equal to two frame of 15 time slots. Thus, one out of 30 power control command (TPC) fields is punctured for USTS signaling purposes. In this prior-art signaling method, the searcher in the UE has only 20 ms to verify the position of the UE in time domain. For indoor/micro cells, this 20 ms time period is too short for most usable scenarios because the timing is changed with a much slower rate. If the TAB command is misinterpreted by the UE, the UE may adjust the timing opposite to what the Node B expects. In this situation, the searcher in Node B RAKE must verify the new position of the UE transmission in only 20 ms.

It is advantageous and desirable to provide a signaling method for timing adjustment in case of signaling errors so as to allow the searcher in the UE sufficient time to adjust the transmission timing.

SUMMARY OF THE INVENTION

The object of the present invention is to provide a robust signaling method for the uplink timing, whether to delay or to advance the transmission time, in an environment where signaling command transmission in the downlink may be subject to errors.

According to the first aspect of the present invention, a method for use in a frequency division multiplex (FDD) mode of a terminal of a mobile telephone network having a plurality of base stations capable of communication with the terminal over corresponding radio uplinks and downlinks, wherein the communication is carried out in radio frames and each radio frame for the radio downlinks comprises a plurality of time slots for carrying control information, and the control information includes a transmit power command, and wherein the terminal conveys a dedicated physical channel (DPCH) message to one of the base stations in each radio frame for the radio uplinks according to an uplink transmission time, and said one base station is capable of comparing a received time of the message to a desired arrival time for determining the time difference therebetween and assigning to the transmit power command a value indicative of the time difference, wherein the assigned value is equal to a first value if the received time is earlier than the desired arrival time, and the assigned value is equal to a second value if the received time is later than the desired arrival time. The method comprises the steps of providing the terminal M assigned values over a time period equal to N radio frame times, wherein N is an integer greater than 2; and adjusting by the terminal the uplink transmission time based on the assigned values over said time period.

Preferably, M is an integer ranging from 1 to N/2 and N is an even number, but M can also be an integer ranging from 1 to (N+1)/2 wherein N is an even number, or an integer ranging from 1 to N which is even or odd. Furthermore, it is preferred that the assigned values are assigned to the transmit power command in every other connection frame, but it is also possible to assign the assigned values to the transmit power command in every connection frame, so long as the time period is greater than 2 radio frame times.

Preferably, when M is greater than or equal to 2, the adjusting step is carried based on a sum of the assigned values.

Preferably, the assigned value is assigned to the transmit power command in the last time slot of the radio frame, but it is possible to assign the assigned value to the transmit power command in any one of the 15 time slots.

According to the second aspect of the present invention, an apparatus for use in a frequency division multiplex (FDD) mode of a terminal of a mobile telephone network having a plurality of base stations capable of communication with the terminal over corresponding radio uplinks and downlinks, wherein the communication is carried out in radio frames and each radio frame for the radio downlinks comprises a plurality of time slots for carrying control information, and the control information includes a transmit power command, and wherein the terminal conveys a dedicated physical channel (DPCH) message to one of the base stations in each radio frame for the radio uplinks according to an uplink transmission time, and said one base station is capable of comparing a received time of the message to a desired arrival time for determining the time difference therebetween and assigning to the transmit power command a value indicative of the time difference. The apparatus comprises a first mechanism, responsive to the time difference, for providing the terminal M assigned values over a time period equal to N radio frame times, wherein N is an integer greater than 2; and a second mechanism, responsive to the assigned values, for adjusting the uplink transmission time based on the assigned values over said time period.

Preferably, wherein M is greater than 2, the apparatus also includes a third mechanism for summing the M assigned values so as to allow the second mechanism to adjust the uplink transmission time based on the summed value.

According to the third aspect of the present invention, a mobile terminal for use in a frequency division multiplex (FDD) mode of a terminal of a mobile telephone network having a plurality of base stations capable of communication with the terminal over corresponding radio uplinks and downlinks, wherein the communication is carried out in radio frames and each radio frame for the radio downlinks comprises a plurality of slots for carrying control information, and the control information includes a transmit power command, and wherein the mobile terminal has means to convey a dedicated physical channel message according to an uplink transmission time to one of said plurality of base stations in each radio frame for the radio uplinks, and the received base station is capable of comparing a received time of the message to a desired arrival time for determining the time difference therebetween, and assigning to the transmit power command a value indicative of the time difference for providing to the terminal a signal indicative of the assigned value. The terminal comprises a first mechanism, responsive to the signal, for retrieving M assigned values over a time period equal to N radio frame times, wherein N is an integer greater than 2; and a second mechanism, responsive to the assigned values, for adjusting the uplink transmission time based on the assigned values over said time period.

Preferably, the terminal also includes a third mechanism for summing the assigned values when M is greater than or equal to 2, so as to allow the second mechanism to adjust the uplink transmission time based on the summed value.

The present invention will become apparent upon reading the detailed description taken in conjunction with FIGS. 3 and 4.

BEST MODE FOR CARRYING OUT THE INVENTION

Figure 1:
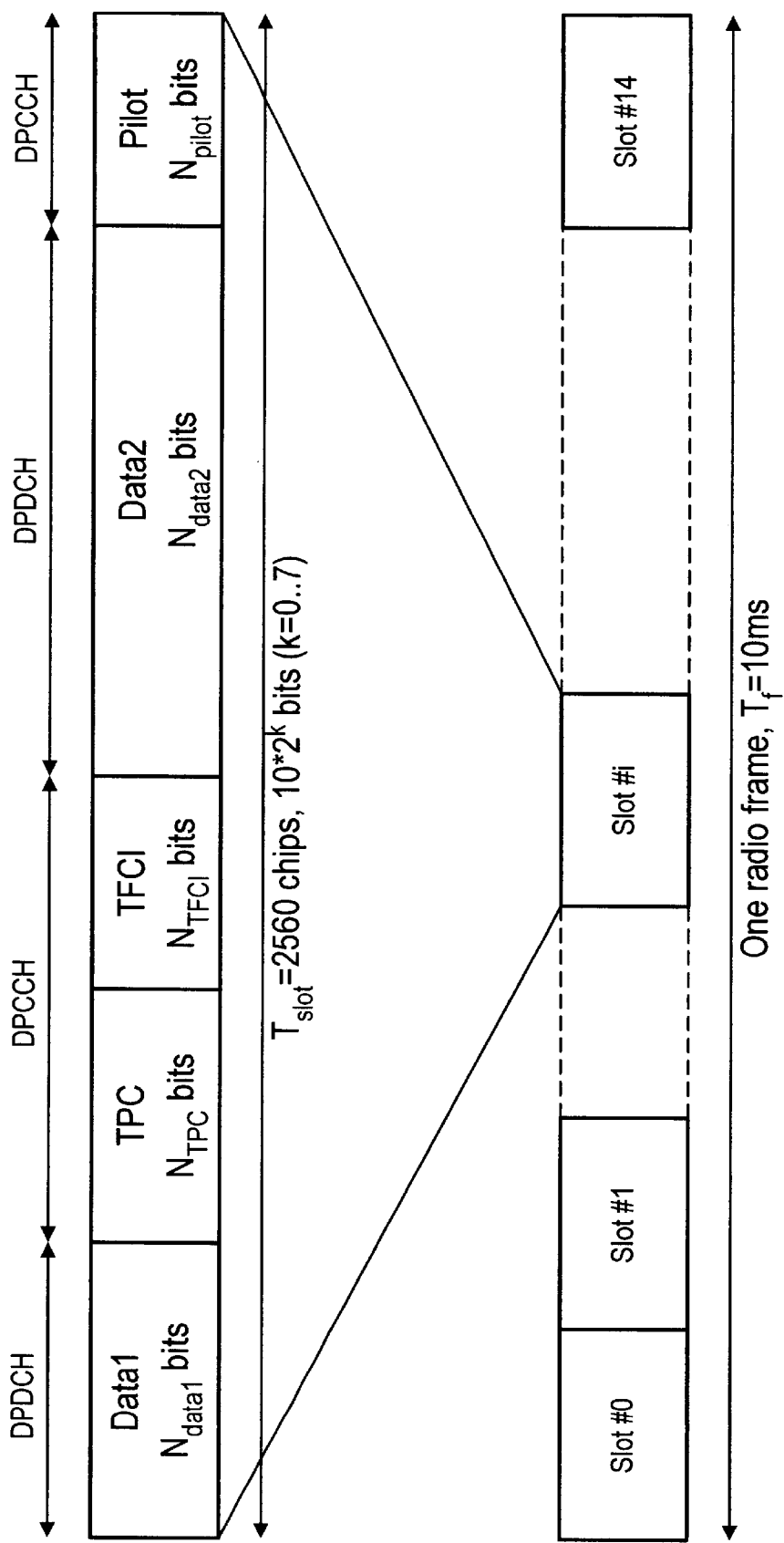
FIG. 1 is a diagram showing the frame structure for downlink DPCH.
Figure 2:
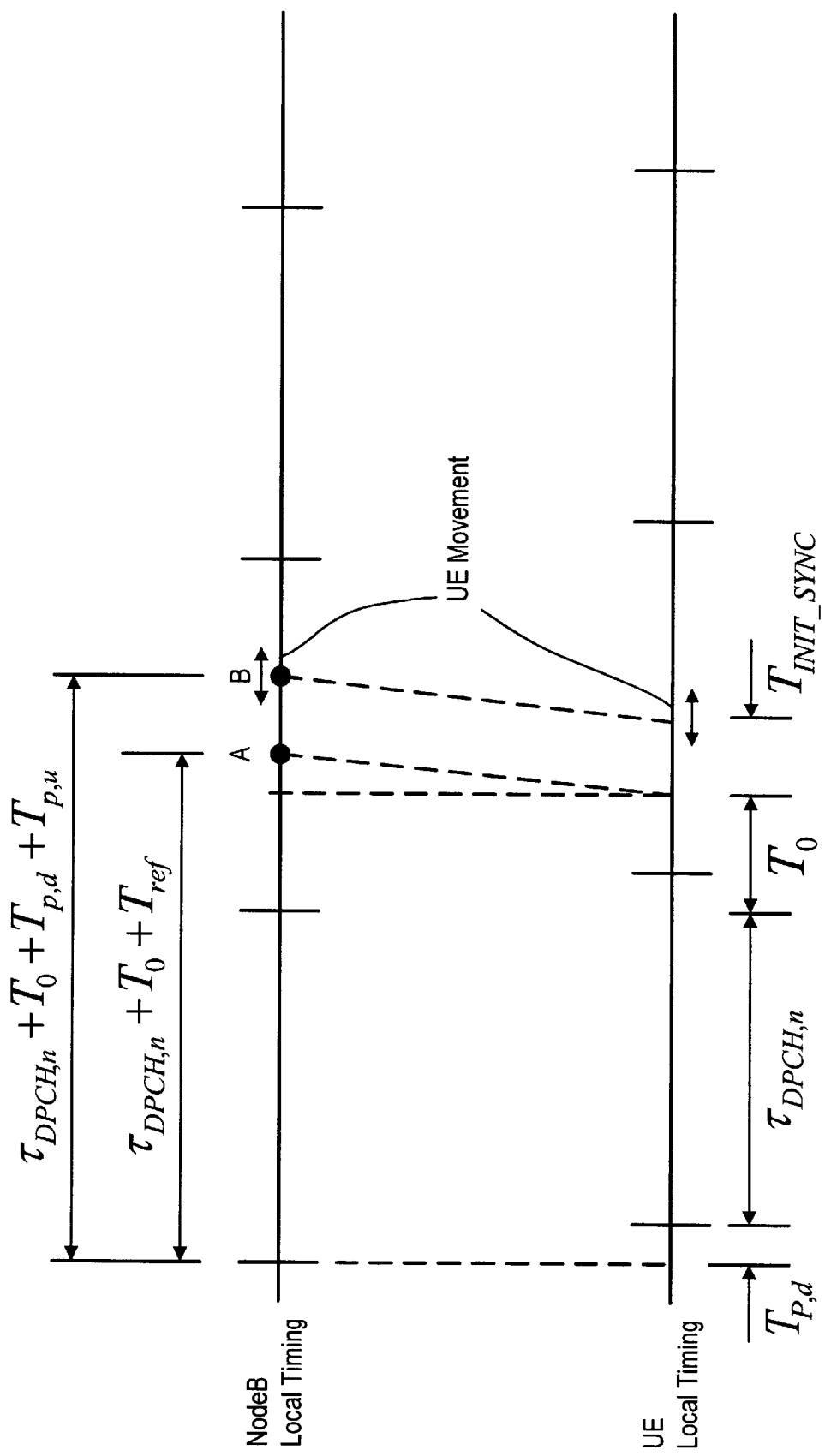
FIG. 2 is a timing diagram showing the arrival time of a DPCH message at a Node B.
Figure 3A:
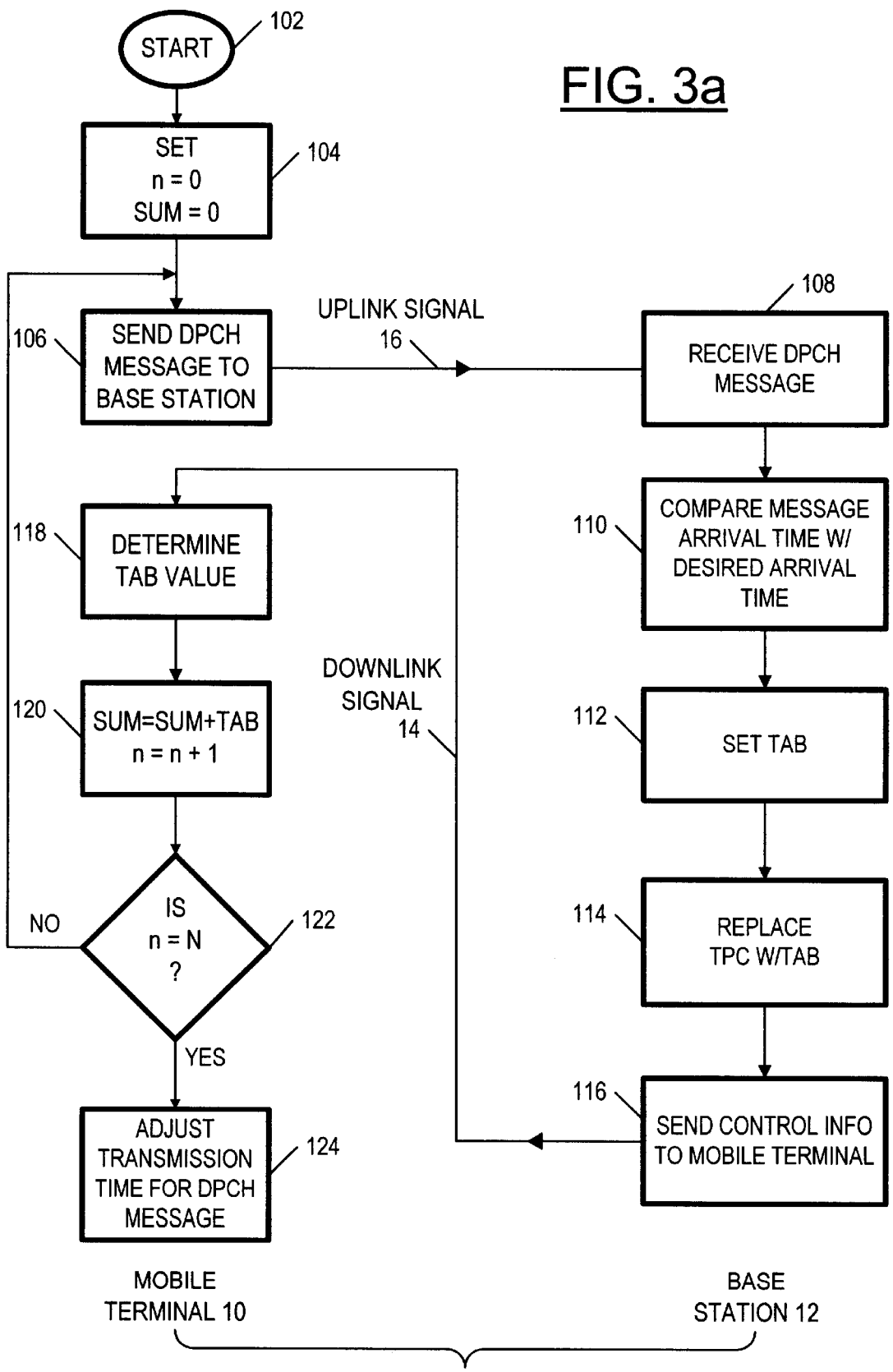
FIG. 3a is a flow chart showing the preferred signaling method for uplink synchronous transmission, according to the present invention.
Figure 3B:
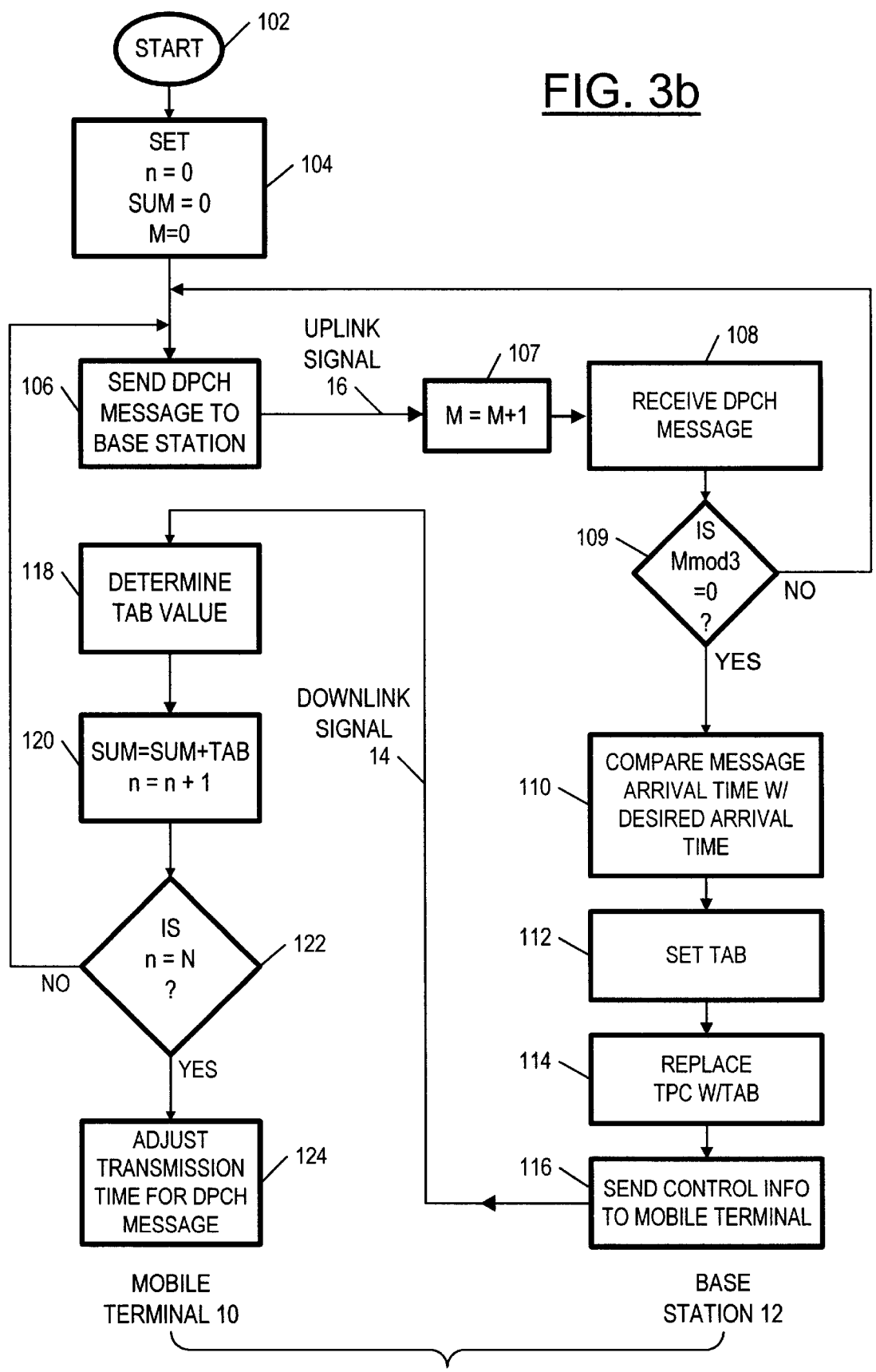
FIG. 3b is a flow chart showing another signaling method for uplink synchronous transmission, according to the present invention.
Figure 4:
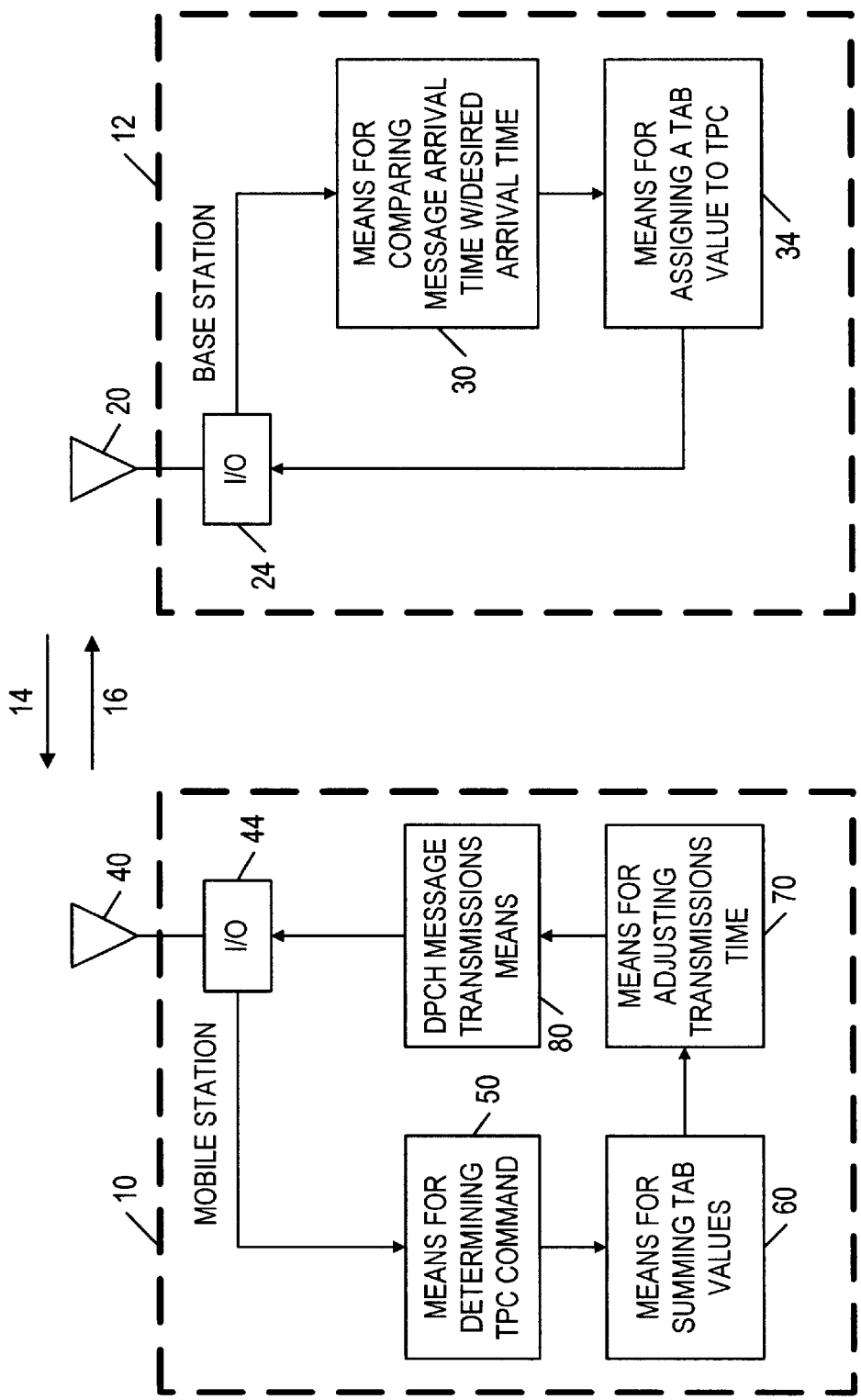
FIG. 4 is a block diagram illustrating the apparatus for carrying out the signaling method for uplink synchronous transmission, according to the present invention.

FIGS. 3a and 3b show a methodology which may be carried in a mobile terminal 10, as shown FIG. 4. The mobile terminal 10 may be in communication with a base station 12 by a radio uplink 14 and downlink 16. Together, the mobile terminal 10 and the base station 12 form part of a radio interface, called UTRAN (Universal Terrestrial Radio Access Network), as described hereinabove. As shown in FIG. 4, an input/output (I/O) unit 24 of the base station 12 receives a signal from the uplink 14 via an antenna 20, wherein the signal contains a DPCH message from the mobile terminal 10 with the uplink transmission time initially adjusted through the timing control information given by higher layer of the radio network. Ideally, the DPCH message would arrive at a desired time (point B in FIG. 1). However, if the arrival time is earlier than the desired arrival time, as determined by a comparison means 30 in the base station 12, an assigning means 34 will set a Time Alignment Bit (TAB) to a first value. If the arrival time is later than the desired arrival time, the TAB is set to a second value. For every timing adjustment period (typically equal to two frames contained in the signal to the downlink 16), the TPC bit in slot #14 (see FIG. 2) is replaced by the TAB. Upon reception by an input/output (I/O) unit 44 of a signal from the downlink 16 via an antenna 40, the mobile terminal 10 provides a signal to a determining means 50 so that the determining means 50 can make a decision on the TAB as to whether the TAB is set to the first value or the second value. The determining means 50 sends a signal to a summing means 60 so that the TAB values can be summed over a number of frames. Because only the TPC bit in slot #14 of every timing adjustment period (e.g., a frame with CFN mod 2=0, or an even-numbered frame with CFN being the connection frame number) is replaced by the TAB, one out of 30 TPC fields is punctured. This TPC puncturing occurs at every 20 ms. It is preferred that the TPC puncturing process is repeated over M times to allow the summing means to sum the TAB values over a time span of M×20 ms before the summed value is sent to an adjusting means 70. Based on the summed value, the adjusting means 70 determines whether the transmission time is delayed or advanced by a time period. Accordingly, the adjusting means 70 control the uplink transmission time of a DPCH message by the transmission means 80.

It should be noted that it is possible to puncture the TPC only one or more times over N connection frames where N is greater than 2. For example, if N is equal to 20, the TPC can be punctured once, twice or ten times over the 20 frame times. This means that the terminal 10 has 200 ms to adjust the uplink transmission time based on the one, two or ten TAB values. Furthermore, it is possible to puncture the TPC in one time slot in every frame, rather than every other frame. Moreover, when the TPC is replaced by a TAB only once over a time period of N frames and there are no "summed values" in that period of time, the terminal 10 adjusts the uplink transmission time based on that one TAB. Moreover, even if there are 2 or more TABs over the N frame times, it is not necessary to sum these TABs to obtain a summed value. The terminal 10 may adjust the uplink transmission time based on whether the first value or the second value is received by the terminal 10 more frequent within the N frame times. In addition to the first and second values, it is also possible to assign a third value to the TAB to instruct the mobile terminal 10 not to adjust the uplink transmission time—just to do nothing. This third value is especially useful when the arrival time is substantially, or on the average, equal to the desired arrival time, or alternately earlier and later than the desired arrival time.

Referring to FIG. 3a, after entering in a step 102, the mobile terminal 10 (see FIG. 4) starts the time adjustment process at step 104 by setting n=0 to monitor the number of times the base station 12 punctures the TPC. The mobile terminal 10 also sets sum=0 to start a new summed value. At step 106, the mobile terminal 10 sends a DPCH message in an uplink signal 16 to the base station 12. Upon receiving the DPCH message at step 108, the base station 12 compares the arrival time of the DPCH message with a desired arrival time at step 110. If the message arrival time is earlier than the desired arrival time, the base station 12 sets the TAB to a first value at step 112. If the message arrival time is later than the desired arrival time, the TAB is set to a second value. For every timing adjustment period, the newly set TAB value replaces the TPC bit in slot #14 of the frame at step 114. The TAB value is sent to the mobile terminal 10 along with other control parameters in a DPCH frame at step 116 via a downlink signal 14. Upon receiving the frame with the punctured TPC command, the mobile terminal 10 determines the TAB value at step 118. The mobile terminal 10 adds the TAB to the summed value at step 120. If it is determined at step 122 that the mobile terminal 10 has added a total of N TAB values, the mobile terminal 10 will decide at step 124 whether the timing for message transmission is adjusted forward or backward by a time period. Otherwise, the process is repeated at step 106.

It should be noted that the flow chart, as shown in FIG. 3a, is based on the choice that the TPC is replaced by a TAB in every timing adjustment period, which is equal to two frame times (or every frame with CFN mod 2=0), and the terminal 10 adjusts the uplink transmission time in each time period equal to 2N frame with the TPC being punctured N times. Thus, the number of TABs to be summed is equal to N. For example, if N is equal to 6 over a time period of 120 ms, the number of TABs is equal to 6. However, it is possible that the TPC is punctured differently. For example, the TPC is punctured every sixth radio frame, or the TPC is punctured only twice over the 120 ms period, as illustrated in the flow chart shown in FIG. 3b. In addition to the steps in the flow chart, as shown in FIG. 3a, a step 109 is provided to determine whether the frame for the radio uplinks is the sixth frame. If it is, the base station compares the arrival time with the desired arrival time and punctures the TPC. Otherwise, the TPC is not punctured.

Preferably, the value N is equal to 10 so that the mobile terminal 10 will have 200 ms to adjust the timing errors. However, N can be any positive integer ranging from 2 to 20 or larger. Furthermore, the TPC field in slot #14 of a downlink radio frame is used to send the TAB to the terminal 10, as described in conjunction with FIGS. 3 and 4. It is possible to puncture the TPC field in other time slot. The first value and the second value for the TAB can be "0" and "1", respectively. Accordingly, the summed value ranges from 0 to N. For example, if N is equal to 10, then the summed value ranges from 0 to 10. The adjusting means 70 (FIG. 4) delays the uplink transmission time if the summed value is less than 6, and advances the time if the summed value is 6 or greater, for example. It is possible to use other numbers for the first and second values. For example, it is possible to assign a complex number such as 1−j to the TAB when the received arrival time is earlier than the desired arrival time, and another complex number such as 1+j when the received arrival time is later than the desired arrival time. Accordingly, the summed value is a complex number located in one of the quadrants of a complex plane, and the adjusting means 70 adjusts the unlink transmission time according to the location of the summed value in the complex plane.

The present invention provides an apparatus and method for signaling a mobile terminal or UE for uplink synchronous transmission for use in a frequency division multiplex mode. The object is to ensure that the DPCH messages from a mobile terminal arrive synchronously at the base station. The methodology is concerned with increasing the adjustment period by concatenating several transmit power commands that are spread over 20 radio frames, for example, so that the searcher in the base station will have sufficient time to verify the position of the UE in the time domain. One benefit of the longer adjustment period is the higher reliability of the time adjustment command. Because verifying the position of the UE in the time domain will inevitably take time and cause extra work for the searcher in the base station, a short adjustment period would increase the risk of actually losing connection between the base station and the mobile terminal. In the environment where the amount of multipath is limited and the UE velocity tends to be lower, the present invention provides a reliable method for uplink synchronous transmission. Overall, the benefit of using the uplink synchronous transmission scheme is to the reduction in the uplink interference level by achieving orthogonality among the users in the uplink direction by synchronizing their uplink transmission timing.

The method and apparatus, according to the present invention, can be in the third generation mobile phone system using wideband coded division multiple access (WCDMA) in a UMTS network. However, the same apparatus and method may also be used in other radio networks for transmission timing adjustment.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method for use in a frequency division multiplex (FDD) mode of a terminal of a mobile telephone network having a plurality of base stations capable of communication with the terminal over corresponding radio uplinks and downlinks, wherein the communication is carried out in radio frames and each radio frame for the radio downlinks comprises a plurality of time slots for carrying control information, and the control information includes a transmit power command, and wherein the terminal conveys a dedicated physical channel message to one of the base stations in each radio frame for the radio uplinks according to an uplink transmission time, and said one base station is capable of comparing a received time of the message to a desired arrival time for determining the time difference therebetween and assigning to the transmit power command a value indicative of the time difference, wherein the assigned value is equal to a first value if the received time is earlier than the desired arrival time, and the assigned value is equal to a second value if the received time is later than the desired arrival time, said method comprising the steps of:

providing the terminal M assigned values over a time period equal to N radio frame times, wherein N is an integer greater than 2; and adjusting the uplink transmission time based on the assigned values over said time period.

2. The method of claim 1, wherein M is an integer ranging from 1 to N.

3. The method of claim 1, wherein N is an even number and M is an integer ranging from 1 to N/2.

4. The method of claim 1, wherein N is an odd number and M is an integer ranging from 1 to (N+1)/2.

5. The method of claim 1, wherein the adjusting step is carried out by the terminal based on a sum of the assigned values when M is greater than or equal to 2.

6. The method of claim 1, wherein the assigned value is assigned to the transmit power command in the last time slot of the radio frame.

7. The method of claim 1, wherein the first and second values are real numbers.

8. The method of claim 1, wherein the first and second values are complex numbers.

9. The method of claim 1, wherein the first value is equal to 0 and the second value is equal to 1.

10. The method of claim 1, wherein the first value is equal to (1−j) and the second value is equal to (1+j).

11. The method of claim 1, wherein the assigned values include a third value indicative of the received arrival time being substantially equal to the desired arrival time.

12. An apparatus for use in a frequency division multiplex (FDD) mode of a terminal of a mobile telephone network having a plurality of base stations capable of communication with the terminal over corresponding radio uplinks and downlinks, wherein the communication is carried out in radio frames and each radio frame for the radio downlinks comprises a plurality of time slots for carrying control information, and the control information includes a transmit power command and wherein the terminal conveys a dedicated physical channel message to one of the base stations in each radio frame for the radio uplinks according to an uplink transmission time, and said one base station is capable of comparing a received time of the message to a desired arrival time for determining the time difference therebetween and assigning to the transmit power command a value indicative of the time difference, said apparatus comprising:

means, responsive to said time difference, for providing the terminal M assigned values over a time period equal to N radio frame times, wherein N is an integer greater than 2; and means, responsive to the assigned values, for adjusting the uplink transmission time based on the assigned values over said time period.

13. The apparatus of claim 12, wherein M is greater than 2, said apparatus further comprising means for summing the M assigned values and the adjusting means adjusts the uplink transmission time based on the summed value.

14. A mobile terminal for use in a frequency division multiplex (FDD) mode of a terminal of a mobile telephone network having a plurality of base stations capable of communication with the terminal over corresponding radio uplinks and downlinks, wherein the communication is carried out in radio frames and each radio frame for the radio downlinks comprises a plurality of slots for carrying control information, and the control information includes a transmit power command, and wherein the mobile terminal has means to convey a dedicated physical channel message according to an uplink transmission time to one of said plurality of base stations in each radio frame for the radio uplinks, and said one base station is capable of comparing a received time of the message to a desired arrival time for determining the time difference therebetween, and assigning to the transmit power command a value indicative of the time difference for providing to the terminal a signal indicative of the assigned value, said terminal comprising:

means, responsive to the signal, for retrieving M assigned values over a time period equal to N radio frame times, wherein N is an integer greater than 2; and means, responsive to the assigned values, for adjusting the uplink transmission time based on the assigned values over said time period.

15. The terminal of claim 14, further comprising means for summing the assigned values when M is greater than or equal to 2, and said adjusting means adjusts the uplink transmission time based on the summed value.

* * * * *